US008711096B1

(12) United States Patent
Zeng et al.

(10) Patent No.: US 8,711,096 B1
(45) Date of Patent: Apr. 29, 2014

(54) DUAL PROTOCOL INPUT DEVICE (75) Inventors: Ke-Cai Zeng, Fremont, CA (US);
Jonathan Young, Boise, ID (US); Pulkit Shah, Bangalore (IN); Yansun Xu, Mountain View, CA (US); Eric Mann, Sammamish, WA (US); Shankar Subramani, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 1083 days.

(21) Appl. No.: 12/413,354

(22) Filed: Mar. 27, 2009

(51) Int. Cl.
*G06F 3/033* (2013.01)

(52) U.S. Cl.
USPC .......................................................... 345/166

(58) Field of Classification Search
None
See application file for complete search history.

(56) References Cited

U.S. PATENT DOCUMENTS

| 3,922,093 A | 11/1975 | Dandliker et al. |
| 4,546,347 A | 10/1985 | Kirsch |
| 4,560,881 A | 12/1985 | Briggs |
| 4,751,380 A | 6/1988 | Victor et al. |
| 4,799,055 A | 1/1989 | Nestler et al. |
| 4,814,553 A | 3/1989 | Joyce |
| 4,920,260 A | 4/1990 | Victor et al. |
| 4,936,683 A | 6/1990 | Purcell |
| 5,086,197 A | 2/1992 | Liou |
| 5,288,993 A | 2/1994 | Bidiville et al. |
| 5,345,527 A | 9/1994 | Lebby et al. |
| 5,391,868 A | 2/1995 | Vampola et al. |
| 5,473,344 A | 12/1995 | Bacon et al. |
| 5,578,813 A | 11/1996 | Allen et al. |
| 5,606,174 A | 2/1997 | Yoshimura et al. |
| 5,644,139 A | 7/1997 | Allen et al. |
| D382,550 S | 8/1997 | Kaneko et al. |
| D385,542 S | 10/1997 | Kaneko et al. |
| 5,703,356 A | 12/1997 | Bidiville et al. |
| 5,729,008 A | 3/1998 | Blalock et al. |
| 5,729,009 A | 3/1998 | Dandliker et al. |
| 5,781,229 A | 7/1998 | Zediker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |

(Continued)

FOREIGN PATENT DOCUMENTS

| WO | WO99/46603 A1 | 9/1999 |
| WO | WO02/48853 A1 | 6/2002 |

OTHER PUBLICATIONS

U.S. Appl. No. 11/313,133: "Speckle navigation system;" Spurlock et al, filed Dec. 20, 2005; 25 pages.

(Continued)

*Primary Examiner* — Joseph Haley (57) ABSTRACT

A dual protocol input device for use with a host system is provided. In one embodiment, the input device comprises a chip with a number of semiconductor devices integrally formed thereon, including: an optical navigation sensor (ONS) to sense movement of the ONS relative to a surface; a wired protocol block to communicate data from the ONS to the host system by a wired communication protocol; a wireless protocol block to communicate data from the ONS to the host system by a wireless communication protocol; and a micro-controller coupled to the ONS, the wired protocol block and the wireless protocol block, to switch the input device between the wireless communication protocol and the wired communication protocol.

13 Claims, 4 Drawing Sheets

(56) References Cited

U.S. PATENT DOCUMENTS

| | | |
|---|---|---|
| 6,031,218 A | 2/2000 | Piot et al. |
| 6,034,760 A | 3/2000 | Rees |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,176,143 B1 | 1/2001 | Mo et al. |
| 6,195,475 B1 | 2/2001 | Beausoleil, Jr. et al. |
| 6,218,659 B1 | 4/2001 | Bidiville et al. |
| 6,222,174 B1 | 4/2001 | Tullis et al. |
| 6,225,617 B1 | 5/2001 | Dandliker et al. |
| 6,226,092 B1 | 5/2001 | de Lega |
| 6,233,368 B1 | 5/2001 | Badyal et al. |
| 6,255,643 B1 | 7/2001 | Sayag |
| 6,256,016 B1 | 7/2001 | Piot et al. |
| 6,281,881 B1 | 8/2001 | Siddiqui et al. |
| 6,281,882 B1 | 8/2001 | Gordon et al. |
| 6,304,330 B1 | 10/2001 | Millerd et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,618,038 B1 | 9/2003 | Bohn |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,707,027 B2 | 3/2004 | Liess et al. |
| 6,710,855 B2 | 3/2004 | Shiraishi |
| 6,737,636 B2 | 5/2004 | Dietz et al. |
| 6,741,335 B2 | 5/2004 | Kinrot et al. |
| 6,756,980 B2 | 6/2004 | Hayashi |
| 6,774,351 B2 | 8/2004 | Black |
| 6,774,915 B2 | 8/2004 | Rensberger |
| 6,795,056 B2 | 9/2004 | Norskog et al. |
| 6,809,403 B2 | 10/2004 | Gee |
| 6,809,723 B2 | 10/2004 | Davis |
| 6,819,314 B2 | 11/2004 | Black |
| 6,823,077 B2 | 11/2004 | Dietz et al. |
| 6,825,998 B2 | 11/2004 | Yoshida |
| 6,869,185 B2 | 3/2005 | Kaminsky et al. |
| 6,947,459 B2 | 9/2005 | Kurtz et al. |
| 6,950,094 B2 | 9/2005 | Gordon et al. |
| 6,951,540 B2 | 10/2005 | Ebbini et al. |
| 6,967,321 B2 | 11/2005 | Leong et al. |
| 6,977,645 B2 | 12/2005 | Brosnan |
| 7,019,733 B2 | 3/2006 | Koay |
| 7,042,575 B2 | 5/2006 | Carlistle et al. |
| 7,045,763 B2 | 5/2006 | Ballard |
| 7,098,894 B2 | 8/2006 | Yang et al. |
| 7,116,427 B2 | 10/2006 | Baney et al. |
| 7,126,585 B2 | 10/2006 | Davis et al. |
| 7,138,620 B2 | 11/2006 | Trisnadi et al. |
| 7,161,582 B2 | 1/2007 | Bathiche et al. |
| 7,161,682 B2 | 1/2007 | Xie et al. |
| 7,189,985 B2 | 3/2007 | Xie et al. |
| 7,205,521 B2 | 4/2007 | Gruhlke et al. |
| 7,227,531 B2 | 6/2007 | Lutian |
| 7,236,239 B2 | 6/2007 | Hase |
| 7,248,345 B2 | 7/2007 | Todoroff et al. |
| 7,268,341 B2 | 9/2007 | LeHoty et al. |
| 7,285,766 B2 | 10/2007 | Carlisle et al. |
| 7,292,232 B2 | 11/2007 | Ranta et al. |
| 7,321,359 B2 | 1/2008 | Xie et al. |
| 7,435,942 B2 | 10/2008 | Lang |
| 7,450,031 B2 * | 11/2008 | Wang et al. .................. 341/26 |
| 7,505,033 B2 | 3/2009 | Guo et al. |
| 7,515,280 B2 | 4/2009 | Emtman et al. |
| 2003/0058506 A1 | 3/2003 | Green et al. |
| 2005/0083303 A1 | 4/2005 | Schroeder et al. |
| 2005/0109961 A1 | 5/2005 | Bittner et al. |
| 2005/0156915 A1 | 7/2005 | Fisher |
| 2005/0228838 A1 | 10/2005 | Stetson et al. |
| 2005/0258346 A1 | 11/2005 | LeHoty et al. |
| 2005/0259078 A1 | 11/2005 | Roxlo et al. |
| 2005/0259097 A1 | 11/2005 | LeHoty et al. |
| 2005/0259098 A1 | 11/2005 | Trisnadi et al. |
| 2006/0007151 A1 * | 1/2006 | Ram .............................. 345/163 |
| 2006/0022843 A1 * | 2/2006 | Sommers ...................... 340/902 |
| 2006/0187209 A1 | 8/2006 | Lai et al. |
| 2006/0229111 A1 * | 10/2006 | Li et al. ......................... 455/571 |
| 2006/0279545 A1 | 12/2006 | Lan et al. |
| 2007/0002020 A1 * | 1/2007 | Ranta et al. ................... 345/166 |
| 2007/0103431 A1 * | 5/2007 | Tabatowski-Bush ......... 345/156 |
| 2007/0291002 A1 * | 12/2007 | Yao et al. ...................... 345/166 |
| 2009/0027342 A1 * | 1/2009 | Kao .............................. 345/166 |
| 2010/0265179 A1 * | 10/2010 | Ram .............................. 345/163 |

OTHER PUBLICATIONS

USPTO Miscellaneous Action with SSP for U.S. Appl. No. 11/313,133 dated Dec. 20, 2006; 1 page.

USPTO Non-Final Rejection for U.S. Appl. No. 11/313,133 dated Jan. 5, 2009; 7 pages.

International Written Opinion of the International Searching Authority dated Feb. 25, 2008 for International Application No. PCT/US06/47802; 4 pages.

International Search Report of the International Searching Authority dated Feb. 25, 2008 for International Application No. PCT/US06/47802; 2 pages.

U.S. Appl. No. 11/1281,988: "Speckle sizing and sensor dimensions in optical positioning device;" Carlisle et al.; 27 pages, May 13, 2005.

USPTO Notice of Allowance for U.S. Appl. No. 11/128,988 dated Feb. 2, 2006; 7 pages.

R.E. Kalman, "A New Approach to Linear Filtering and Prediction Problems," Transactions of the ASME—Journal of Basic Engineering, Copyright 1960, Research Institute for Advanced Study; Baltimore, MD; 12 pages.

USPTO Notice of Allowance for U.S. Appl. No. 11/123,326 dated Jul. 9, 2007; 4 pages.

U.S. Appl. No. 11/124,858: "Optical positioning device using telecentric imaging," Trisnadi et al.; 31 pages, May 9, 2005.

USPTO Non-Final Rejection for U.S. Appl. No. 11/124,858 dated Oct. 8, 2008; 17 pages.

USPTO Non-Final Rejection for U.S. Appl. No. 11/124,858 dated Feb. 25, 2009; 23 pages.

1st Office Action for Korean Patent Application No. 10-2006-7026821 dated Apr. 28, 2008; 2 pages.

1st Office Action for China Patent Application No. 200580022643.5 dated Jan. 4, 2008; 14 pages.

International Search Report of the International Searching Authority for Application No. PCT/US2005/017462 dated Sep. 14, 2006; 4 pages.

U.S. Appl. No. 11/129,967: "Optical positioning device having shaped illumination," Carlisle et al.; 27 pages, May 16, 2005.

USPTO Non-Final Rejection for U.S. Appl. No. 11/129,967 dated Dec. 6, 2006; 8 pages.

USPTO Final Rejection for U.S. Appl. No. 11/129,967 dated May 31, 2007; 8 pages.

USPTO Notice of Allowance for U.S. Appl. No. 11/129,967 dated Aug. 6, 2007; 4 pages.

USPTO Non-Final Rejection for U.S. Appl. No. 11/123,326 dated Mar. 21, 2007; 6 pages.

U.S. Appl. No. 11/261,316: "Two-Dimensional Motion Sensor," Trisnadi et al.; 55 pages, Oct. 28, 2005.

(56) References Cited

OTHER PUBLICATIONS

USPTO Non-Final Rejection for U.S. Appl. No. 11/261,316 dated Jun. 6, 2006; 6 pages.
USPTO Notice of Allowance for U.S. Appl. No. 11/261,316 dated Aug. 23, 2006; 6 pages.
USPTO Miscellaneous Action for U.S. Appl. No. 11/123,326 dated Jun. 8, 2005; 1 page.
U.S. Appl. No. 11/582,776: "Two-Dimensional Motion Sensor," Trisnadi et al.; 54 pages, Oct. 18, 2006.
USPTO Non-Final Rejection for U.S. Appl. No. 11/582,776 dated Sep. 10, 2007; 8 pages.
USPTO Notice of Allowance for U.S. Appl. No. 11/582,776 dated May 16, 2008; 6 pages.
U.S. Appl. No. 11/123,525: "Optical positioning device with multi-row detector array," Roxlo et al.; 51 pages, May 5, 2005.
USPTO Miscellaneous Action for U.S. Appl. No. 11/123,525 dated Jun. 10, 2005; 1 page.
USPTO Non-Final Rejection for U.S. Appl. No. 11/123,525 dated Apr. 14, 2008; 20 pages.
International Search Report of the International Searching Authority for Application No. PCT/US2005/017375 dated Oct. 2, 2006; 2 pages.
U.S. Appl. No. 11/123,527: "Optical positioning device resistant to speckle fading," LeHoty et al.; 52 pages, May 5, 2005.
USPTO Non-Final Rejection for U.S. Appl. No. 11/123,527 dated Apr. 9, 2008; 18 pages.
International Search Report of the International Searching Authority for International Application No. PCT/US2005/017461 dated Nov. 23, 2006; 3 pages.
U.S. Appl. No. 11/123,500: "Optical positioning device using different combinations of interlaced photosensitive elements," Lehoty et al.; 49 pages, May 5, 2005.
USPTO Miscellaneous Action for U.S. Appl. No. 11/123,500 dated Jun. 8, 2005; 1 page.
USPTO Non-Final Rejection for U.S. Appl. No. 11/123,500 dated Apr. 11, 2008; 17 pages.
International Search Report of the International Searching Authority for International Application No. PCT/US2005/017459 dated Sep. 26, 2006; 2 pages.
"The Examiner's Grounds for Rejection" from Korean Patent Office for Patent Application No. 10-2006-7026956; Dec. 31, 2007; 4 pages.
U.S. Appl. No. 11/123,326: Optical Position Sensing Device including Interlaced Groups of Photosensitive Elements, Lehoty et al., May 4, 2005.

* cited by examiner

DUAL PROTOCOL INPUT DEVICE

TECHNICAL FIELD

The present disclosure relates generally to input devices, and more particularly to a dual protocol input device comprising a single chip architecture.

BACKGROUND

Input devices, such as optical computer mice, trackballs, joysticks, and touch pads, are commonly used for interfacing with host data processing systems, such as personal computers, workstations, entertainment systems, and game consoles. Conventional input devices typically operate in one of two communication protocols or modes, either a wired protocol in which the input device communicates with the host system via a cable, or a wireless protocol in which the device communicates via an infrared (IR) or radio link. The wired protocol is inconvenient in that the cable is cumbersome and limits the movement of the input device. The wireless protocol allows for the omission of the cable, but requires batteries to supply power for the device, which can result in drawbacks. For example, replacement or recharging of the batteries typically results in the device not being useable for a period.

SUMMARY

A dual protocol input device and method of operating the same are provided for use with a host system. Generally, the input device comprises a chip with a number of semiconductor devices integrally formed thereon. The chip includes: (i) an optical navigation sensor (ONS) to sense movement of the ONS relative to a surface; (ii) a wired protocol block to communicate data from the ONS to the host system by a wired communication protocol through a wired connection; (iii) a wireless protocol block to communicate data from the ONS to the host system by a wireless communication protocol through a wireless connection; and (iv) a micro-controller coupled to the ONS, the wired protocol block and the wireless protocol block, to switch the input device between the wireless communication protocol and the wired communication protocol without interruption of data from the ONS to the host system; and (v) a power controller that manages the use and switching of power supply through a wired connection or through a battery power with boost regulator.

BRIEF DESCRIPTION OF THE DRAWINGS

These and various other features of the interface device and methods for using the same will be apparent upon reading of the following detailed description in with the accompanying drawings and the appended claims provided below, where:

DETAILED DESCRIPTION

A dual protocol input device and method of operating the same are provided for use with a host system. By input device it is meant a device such as a computer mouse, trackball, joystick, or touchpad, which can be used to interface with and input data to the host system, for example, to position a cursor or make a selection on the host system. By host system, it is meant a data processing system, such as personal computers, workstations, entertainment systems, and game consoles.

Figure 1:
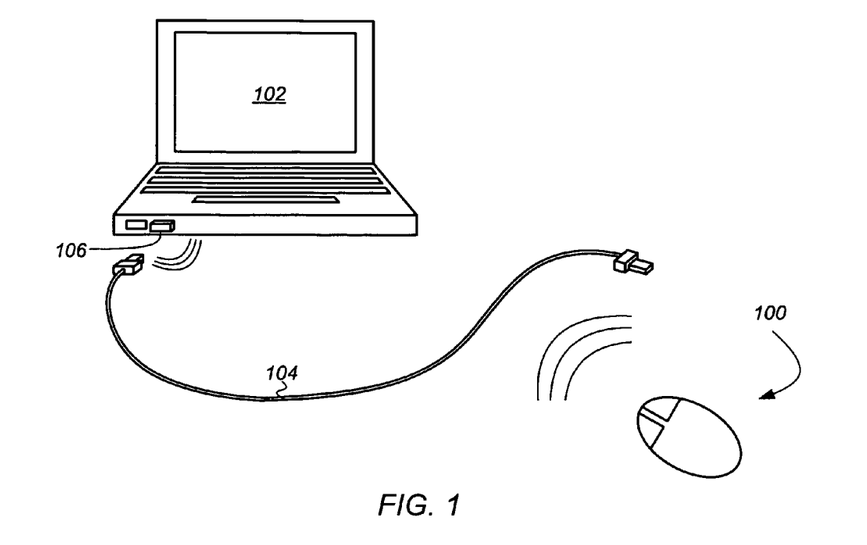
FIG. 1 is a perspective view of a dual protocol input device for use with a host system according to an embodiment of the present disclosure.

Referring to FIG. 1, in one embodiment according to the input device 100 is a computer mouse that is configured to communicate data with a host computer system 102 either by a wired communication protocol through a wired connection 104, or by a wireless communication protocol through a wireless connection to a transmitter/receiver, such as a universal serial bus (USB) dongle 106, coupled to the computer system. The wired connection 104 can include a separate wire or cable, such as a PS/2 or USB cable, as shown, that can be disconnected from both the input device 100 and host computer system 102, or a cable that is fixedly attached to the input device and retractably stored therein when not in use. The wired connection 104 can connect to the host computer system 102 through a connector in the dongle 106 or through a separate USB or PS/2 connector. The wireless connection can include an infrared (IR) link using an IR data transmission protocol, or a radio link using a Bluetooth, wireless serial peripheral interface (SPI) or a wireless USB protocol.

Figure 2:
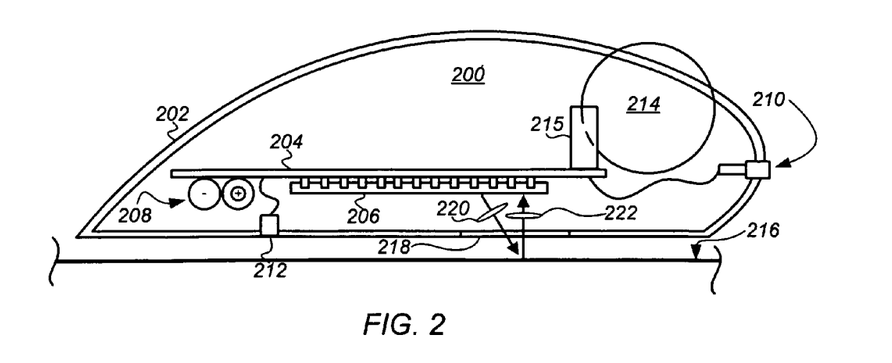
FIG. 2 is a functional block diagram of a dual protocol input device with a single chip architecture according to an embodiment of the present disclosure.

A functional block diagram of an embodiment of a dual protocol input device 200 with single chip architecture is shown in FIG. 2. Referring to FIG. 2, the input device 200 comprises a housing 202 enclosing a circuit board or PCB 204 to which an integrated circuit (IC) chip 206 is mounted. The device 200 further includes a number of batteries 208 electrically coupled to PCB 204 to power the device when operating in wireless protocol, and a wired connection 210 to communicate data with a host system (not shown in this figure) when operating in wired communication protocol. In certain modes of operation, discussed in detail below, including the wired communication protocol the input device 200 can be powered through the wire connection 210. The wire connection 210 can include a receptacle or connector, such as a USB connector, as shown, to receive a separate wire or cable or a cable that is fixedly attached to the input device 200. The input device 200 further includes a number of switches electrically coupled to the PCB 204, including right and left mouse buttons (not shown), a switch 212 to enable a user to turn on and off the device and/or to manually select between modes of operation and sources of power. Optionally, as shown the switches further include a scroll wheel 214 coupled through an optical or mechanical encoder 215 to the PCB 204.

In one embodiment, the input device 200 further includes a light source or illuminator and an optical navigation sensor (ONS), neither labeled in this figure, to illuminate at least a portion of a surface 216 over or on which the device is positioned through a window 218 or opening in the housing 202. Optionally, as in the embodiment shown, the input device further includes illumination optics 220 to direct illumination on to the surface 216, and/or imaging optics 222 to direct reflected images from the surface to the ONS. Although the illumination and imaging optics 220, 222, are shown schematically as single lens, it will be understood that either or both can include one or more lens, prisms, reflectors or optical filters without departing from the scope of the present disclosure.

Figure 3:
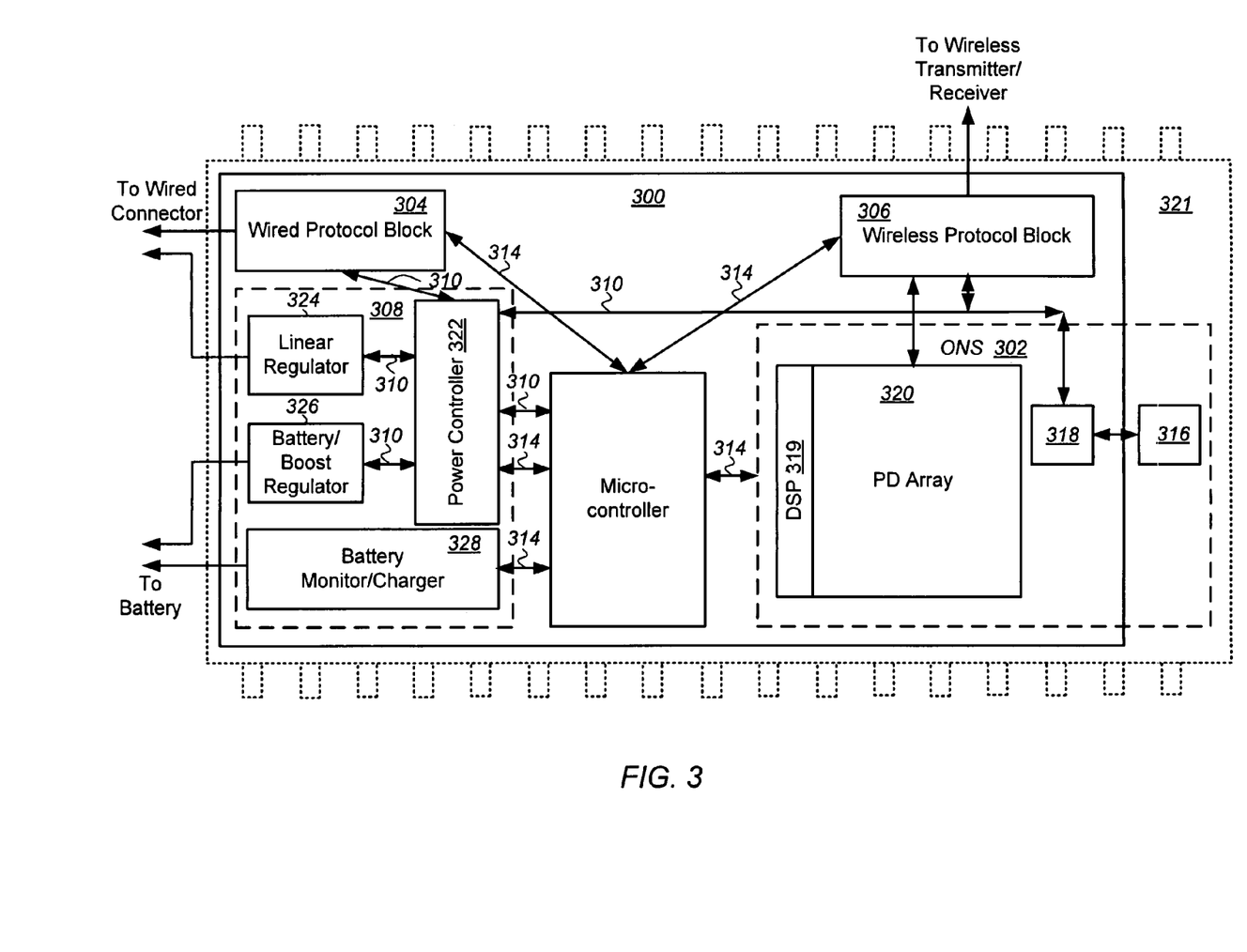
FIG. 3 is a schematic block diagram of a single chip architecture of a dual protocol input device according to an embodiment of the present disclosure.

A schematic block diagram of an embodiment of single chip architecture according to the present disclosure is shown in FIG. 3. Referring to FIG. 3, the chip 300 comprises a number of circuits integrally formed thereon including an optical navigation sensor (ONS 302), and a microcontroller 312. The ONS 302 senses movement of the ONS relative to a surface. The wired protocol block 304 communicates data from the ONS 302 to a host system by a wired communication protocol through a wired connection, and the wireless protocol block 306 communicates data from the ONS to the host system by a wireless communication protocol through a wireless connection. The power system 308 supplies power through a power bus 310 to sub-circuits or systems on the chip 300 either from a battery in the input device or from the host system through the wired connection. The microcontroller 312 is coupled to the power system 308, ONS 302, the wired protocol block 304, and the wireless protocol block 306 through a system bus 314. The microcontroller 312 enables the input device to be seamlessly switched between the wireless communication protocol and the wired communication protocol without resetting or power-cycling the chip 300 or any sub-circuits or systems thereon, and substantially without interruption of data communication from the ONS to the host system.

Generally, the ONS 302 includes an illuminator 316, such as a light emitting diode (LED) or a laser, along with a driver 318 therefore, a photo-sensor 320, such as an array of photodiodes (PD), and a signal processor or digital signal processor (DSP 319) for processing motion data. The illuminator 316 can include one or more discrete components outside the single chip 300 but within the same package 321, as shown FIG. 3, or mounted separately to a PCB or elsewhere in the input device and electrically coupled to the driver 318. In another embodiment, not shown, the illuminator 316 can be integrally formed on the chip along with the associated driver 318 and the ONS 302.

In one embodiment, the ONS 302 is a speckle-based ONS configured to sense movement relative to a surface based on a complex interference pattern created by a light scattered off the surface from a narrow-band or coherent, light source or illuminator 316. Speckle-based ONS 302 use a coherent light source, such as a Vertical Cavity Surface Emitting Laser (VCSEL), to scatter light off an optically rough or irregular surface to generate a random intensity distribution of light known as speckle. In general, any surface with topological irregularities on similar scale size of the wavelength of light from the light source will scatter light into a complete hemisphere in approximately a Lambertian fashion. If a coherent light source is used, the spatially coherent, scattered light will create a complex interference pattern upon detection by a square-law detector with finite aperture. This complex interference pattern of light and dark areas is termed speckle. The exact nature and contrast of the speckle pattern depends on the surface properties (such its roughness, scattering efficiency, polarization preference, light penetration depth), the illumination light properties (such as its wavelength, polarization, and its degree of spatial-coherence), and the feature of the light gathering or imaging optics. Although often highly complex, a speckle pattern is distinctly characteristic of a section of any surface imaged by the ONS 302 and, as such, can be employed to track displacement of the ONS and input device.

The use of a speckle-based ONS 302 provides efficient laser-based light generation and high contrast images even under illumination at normal incidence. This allows for a more efficient operation and conserves power consumption, which is desirable in wireless applications. Additionally, because VCSELs used in speckle-based sensors generally operate in infrared (IR) at wavelengths of from about 750 nanometers (nm) to about 950 nm, and more typically at a wavelength of 850 nm, photosensitive elements (photodiodes) of the photo-sensor 320 can be selected to be sensitive to IR light and substantially insensitive to other wavelengths of light, such as ambient or environmental light.

Referring again to FIG. 3, data, including motion data from the ONS 302, is communicated to the host system though the micro-controller 312 by either the wired protocol block 304 or the wireless protocol block 306. The wired protocol block 304 includes a number of logic elements and registers to format data from the ONS 302, as well as data from switches, buttons, and/or scroll wheels, from the input device to the host system. The wired protocol block 304 can format data into one or more of a number of standard wired communication protocols, including a USB communication protocol, PS/2 communication protocol. Additionally, because the wired protocol block 304 is coupled to and controlled by the microcontroller 312, the wired protocol block can also be programmed by the micro-controller to communicate with the host system in a custom or proprietary protocol specified by the host system or the user.

Similarly, the wireless protocol block 306 can include a number of logic elements and registers to format data for communication from the input device to the host system through a wireless transmitter/receiver (not shown). As noted above, the wireless transmitter/receiver can include, for example, an IR transmitter/receiver or a radio. Although not shown, it will be understood that part or substantially the entire wireless transmitter can be integrally formed on the chip 300, without departing from the spirit and scope of the present disclosure.

The wireless protocol block 306 can format data into one or more of a number of standard wireless communication protocols, including an IR data transmission protocol, a Bluetooth protocol, or wireless USB protocol. In addition, as with the wired protocol block 304, the wireless protocol block 306 can be programmed by the micro-controller to communicate with the host system in a custom or proprietary wireless protocol specified by the host system or the user.

Referring to FIG. 3, power system 308 generally includes a power controller 322, a line or linear regulator 324, a battery regulator 326 integrally formed on the chip 300 with other elements of the power system. In certain embodiments, such as that shown, the power system 308 further includes a battery monitor/charger 328. The power controller 322 includes a number of active and passive elements to supply electrical power at predetermined voltage or voltages from either the linear regulator 324 or the battery regulator 326 to sub-circuits or systems on the chip 300 through the power bus 310. The power controller 322 can be configured to sense any drop in voltage or change status of electrical power provided over the wired connection, and to switch the source of power to or from the wired connection to the battery as appropriate. The power controller 322 is coupled to the micro-controller 312 through the system bus 314, it can be used to signal the micro-controller to automatically switch the input device from a wired to wireless protocol when the wired connection is opened or interrupted, and from wireless to wired protocol when the wired connection is connected. In addition, the power controller 322 can be controlled via the system bus 314 by the micro-controller 312 to automatically or in response to user input to select between the available power sources. For example, as explained in detail below, in certain modes of operation the power controller 322 can be controlled by the micro-controller 312 to supply electrical power from the boost regulator 326 even though the input device is coupled to the host system by the wired connection and operating in a wired communication protocol.

The battery regulator 326 filters and provides electrical power to the power controller 322 from one or more batteries in the input device. In certain embodiments, such as that shown, the battery regulator 326 is a battery/boost regulator that further includes a boost circuit to boost or ramp up battery voltage to a predetermined output or operating voltage. In these embodiments, while all active elements (power switches, etc) of the battery regulator 326 are integrally formed on the chip 300, the boost circuit can further include a number of external passive components including, for example, an external inductor, one or more capacitors, and an external diode. It will be understood, that these external components can include separate components not integrally formed with the chip 300 but packaged in a common semiconductor package, or discrete components mounted to a common PCB and electrically coupled to the battery regulator 326 on the chip, with departing from the scope of the present disclosure.

The battery monitor/charger 328 monitors the voltage output of the batteries (not shown in this figure) in the input device, and, where rechargeable batteries are used can be further configured to charge the batteries when the device is connected to another source of electrical power through the wired connection. It will be understood that the battery monitor/charger 328 can be coupled directly to the micro-controller 312, as shown, or through the power controller 322. It will further be appreciated that the battery monitor/charger 328 can be included in the power system 308; a separate sub-system or circuit integrally formed on the chip 300; or can be implemented using resources of the micro-controller 312.

The micro-controller 312 comprises a software configured, mixed-signal array with a built-in central processing unit (CPU) core. The micro-controller 312 can include in addition to configurable memories, logic blocks and functions, a number of configurable integrated analog and digital peripherals, such as an analog multiplexer (MUX), global analog interconnections (GAI), and a large number of routable General Purpose Input/Outputs (GPIOs). One suitable architecture for the micro-controller 312 is that of the PSoC (Programmable System-on-Chip) micro-controller made by Cypress Semiconductor, of San Jose Calif. The PSoC architecture comprises several types of memory including SRAM for data, Flash memory for instructions and SROM for fixed data, such as firmware, and I/O Registers for controlling and accessing the configurable logic blocks and functions. Except for a number of discrete GPIO that can be directly coupled to buttons and indicators, such as a power on or charging LED, of the input device, the micro-controller 312 needs only to be programmed in firmware to interface with the on-chip 300 wired protocol block 304, wireless protocol block 306, power system 308, and ONS 302.

It will be appreciated from the preceding description that seamless switching of the input device from a wired protocol to a wireless protocol and back is made possible by the integration of the micro-controller on a single chip with the ONS and the wired and wireless protocol blocks. Similarly, seamless switching of the input device from a wired power mode to a battery power mode and back is made possible by the ability to 'hot-swap' between the electrical power sources with the integration of the power controller system on the same chip.

Figure 4:
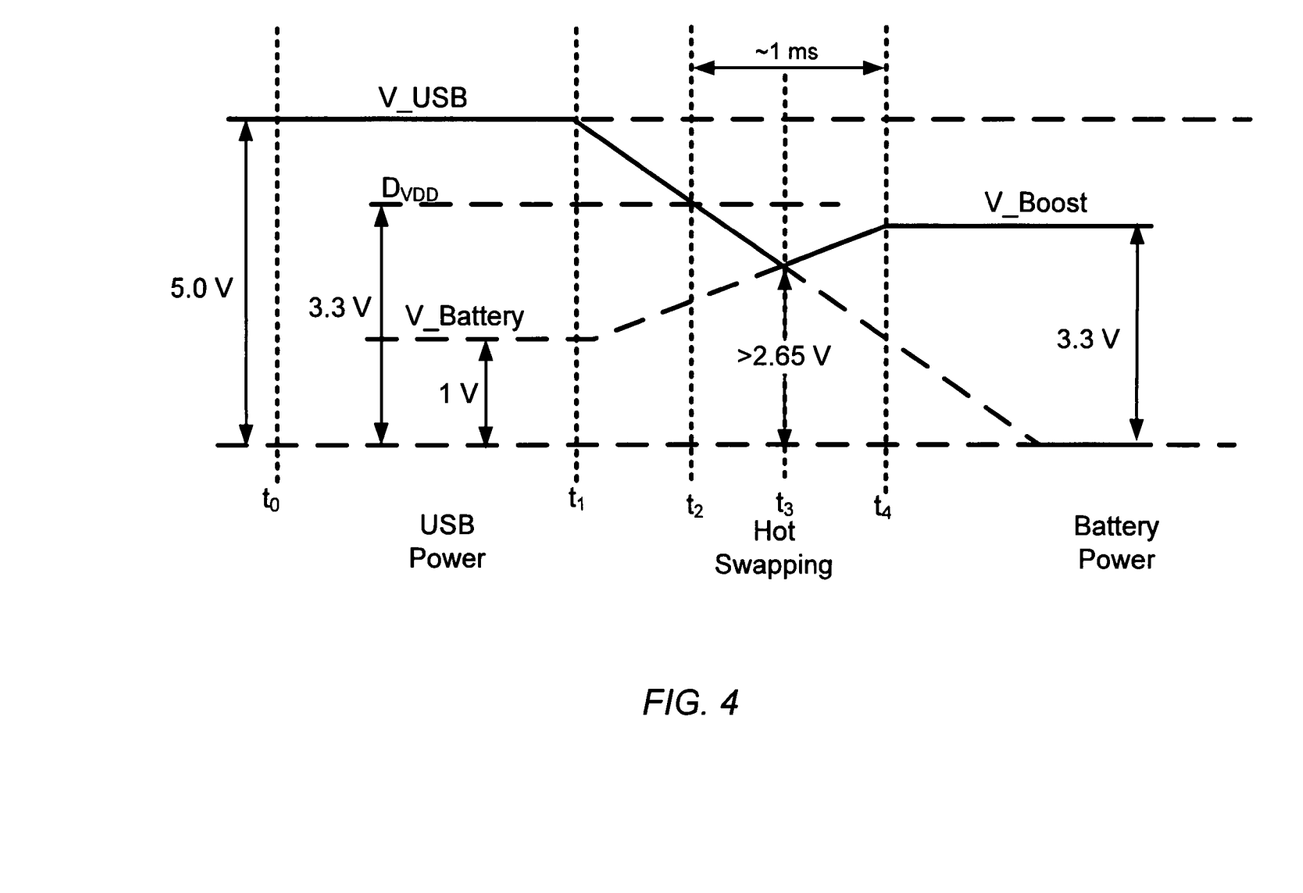
FIG. 4 is a schematic diagram illustrating hot-swapping from USB power to battery boost power according to an embodiment of the present disclosure.

An example of a hot-swapping operation from electrical power supplied by or over the wired connection to electrical power from a battery included in the input device will now be described with reference to FIG. 4. FIG. 4 is a schematic diagram illustrating an example of hot swapping from USB power to battery boost power according to an embodiment of the present disclosure. Referring to FIG. 4, at a first time ($t_0$ to $t_1$) a 5V (V_USB) electrical power is supplied to the input device over a wired USB connection (not shown). The linear regulator (not shown) filters and reduces V_USB to an operating voltage $D_{VDD}$ of about 3.3V. Starting at time $t_1$ the wired USB connection is disconnected causing voltage into the linear regulator to rapidly fall. At the same instant, $t_1$, the power controller controls the boost regulator (not shown) to begin boosting an output voltage of the boost regulator from a battery voltage lower than 2.90 V, for example of about 1V, to a boosted target output voltage (V_boost) of about 3.3 V. V_USB continues to drop until at time $t_2$ it is less than the 3.3V of $D_{VDD}$, and at time $t_3$ is passed by the rising boosted battery voltage (V_boost) when both are greater than about 2.65V. At time $t_4$, V_boost is substantially equal to the operating voltage $D_{VDD}$ of about 3.3V, and the input device has been hot-swapped from one source of power to another in less than about 1 ms and without resetting or power cycling the chip.

Various operating modes for a dual protocol/dual power input device according to the present disclosure are shown in Table I below. Referring to Table I, mode 1 and 2 are the fundamental operating modes. Whenever there is wired connection to the host available, the input device is automatically configured by the micro-controller to operate in the wired communication protocol using power supplied from the host system. It will be understood that the device can be simultaneously charging the batteries while operating in this mode. Whenever there is no wired connection available (mode 2), the input device is automatically configured by the micro-controller to operate in the wireless communication protocol using power supplied from the battery. Modes 3 and 4 are examples of advanced features that may be manually selected by the user. Thus, in mode 3 the input device can operate in wireless protocol while using power for the device is provided by a wire connector. An example of where this might be used is when the input device is associated with a host system located some distance away, such as an entertainment system, and the input device is powered from a USB power adapter plugged into a convenient outlet or a closer device. Mode 4 might be used where the host system is itself power limited, for example a battery operated PC, to extend the battery life of the host system. Mode 5 describes a situation where there is a wired connection available and rechargeable batteries are being used, if the battery voltage is below than a threshold, the micro-controller will turn the battery monitor into a battery charger while the input device is otherwise not being used.

TABLE I

| Mode | Protocol | Power |
| --- | --- | --- |
| 1 | Wired | Wired/USB |
| 2 | Wireless | Battery/Battery Boost |
| 3 | Wireless | Wired/USB |
| 4 | Wired | Battery/Battery Boost |
| 5 | N/A | Battery-Charger |

Figure 5:
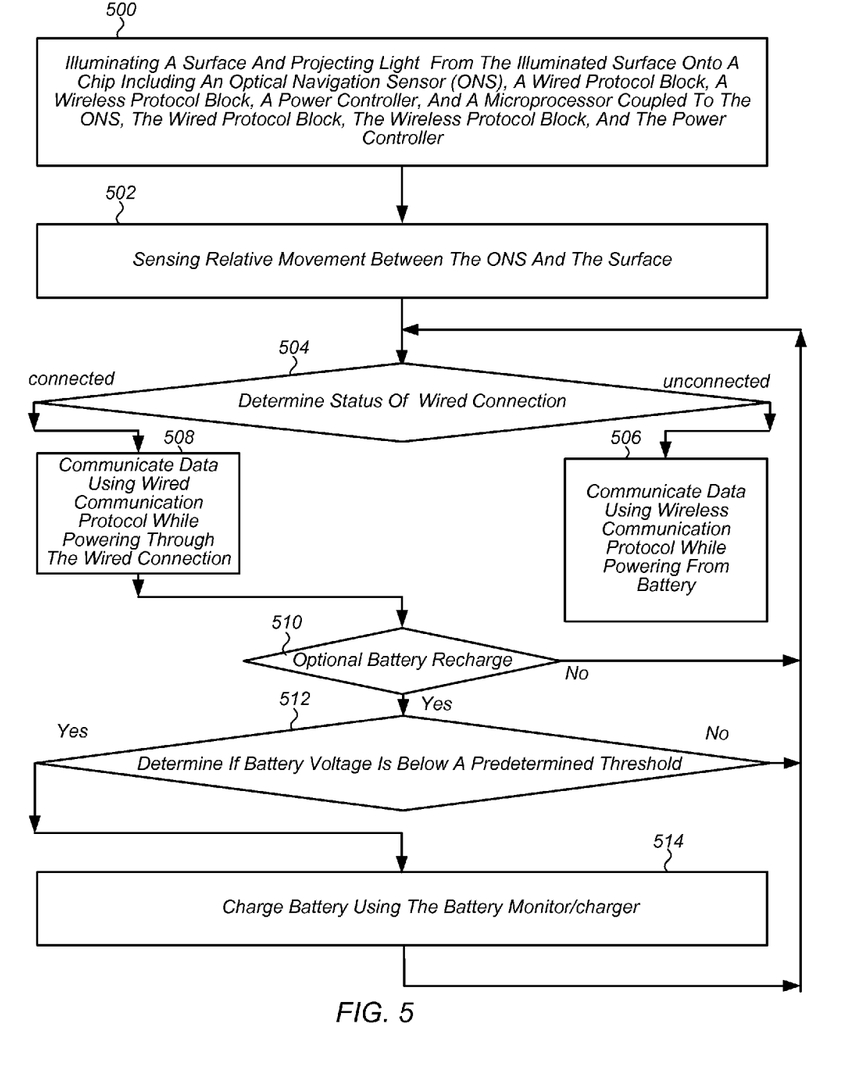
FIG. 5 is a flowchart illustrating a method for seamlessly switching a dual protocol input device between different operating protocols according to an embodiment of the present disclosure.

Embodiments of methods of operating a dual protocol input device to seamlessly switch between the first and second operating modes will now be described with reference to the flowchart of FIG. 5. In a first block, a surface is illuminated and light scattered from the surface is projected onto at least a portion of a chip including an ONS, a wired protocol block, a wireless protocol block, a power controller, and a microprocessor coupled to the ONS, the power controller, the wired protocol block and the wireless protocol block (500). Relative movement between the ONS and the surface is sensed using ONS, for example by sensing movement of a speckle pattern as described above (502). Next, the status of the wired connection is determined, for example, by detecting the presence of a voltage supplied to linear regulator using the power controller and/or the micro-controller (504). If no connection is detected, the micro-controller automatically configures the input device to communicate data using the wireless communication protocol while powering the device from battery (506). The micro-controller continues to monitor the status of the wired connection. If a connection is detected, the micro-controller automatically configures the input device to communicate data using the wired communication protocol while powering the device through the wired connection (508). Again, the micro-controller continues to monitor the status of the wired connection to change to a wireless communication protocol if it is disconnected.

Optionally, where rechargeable batteries are used (510), the status of the battery charge is determined (512), and if the battery charge is below a predetermined threshold, the battery is charged using the battery monitor/charger (514). Finally, the micro-controller continues to monitor the status of the wired connection.

Although, as noted above the flowchart of FIG. 5 is directly applicable to the first and second operating modes of Table I, it will be understood that the method illustrated can also be made applicable to the third and fourth operating modes through the elimination of some actions or blocks and the inclusion of user action. That is a user can manually select the communication protocol and/or a source of power. For example, the user may manually select to operate the input device in mode three by communicating in wireless protocol while powering it from electrical power provided over a wired connection, which may or may not be connected to the host computer system. Similarly, a user may manually select a wired communication protocol while the input device is nevertheless powered from the battery, to conserve power of the host computer system.

In other embodiments, the microcontroller can include firmware to automatically transition between operating modes three and four. For example, the input device can be a wireless device, such as a wireless game pad, that is not intended to communicate with a host system through a wired connection. Should the user plug into a wired power source (such as a PC USB port) because batteries are low, the firmware will automatically switch the input device from operating mode two to operating mode three. Conversely, should the input device be unplugged from the wired power source the firmware will automatically and seamlessly switch the input device from operating mode three to operating mode two, substantially without interruption of the wireless communication between the device and the host system.

Thus, embodiments of dual protocol/dual power input devices and methods for using the same have been described. Although the present disclosure has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure may be provided to comply with 37 C.F.R. §1.72(b), requiring an abstract that will allow the reader to quickly ascertain the nature of the technical disclosure. It may be submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure may be not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the control system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment may be included in at least one embodiment of the dual protocol input device or method. The appearances of the phrase "one embodiment" in various places in the specification do not necessarily all refer to the same embodiment. The term "to couple" as used herein may include both to directly connect and to indirectly connect through one or more intervening components.

What is claimed is:

1. A dual protocol input device comprising:
a chip with a number of semiconductor devices integrally formed thereon, including:
an optical navigation sensor (ONS) to sense movement of the ONS relative to a surface;
a wired protocol block to communicate data from the ONS to a host system by a wired communication protocol;
a wireless protocol block to communicate data from the ONS to the host system by a wireless communication protocol;
a micro-controller directly coupled through on-chip system bus to the ONS, the wired protocol block and the wireless protocol block, to control the ONS, the wired protocol block and the wireless protocol block to switch the input device between the wireless communication protocol and the wired communication protocol without interruption of data between the ONS and the host system or resetting the chip; and
a power system comprising a boost regulator to boost an output voltage from a battery in the input device to an operating voltage of the chip, a linear regulator to regulate power supplied through a wired connection to the input device, and a power controller configured to switch the power system between power supplied from the battery and power supplied through the wired connection independent of the communication protocol selected by the micro-controller.

2. An input device according to claim 1, wherein the micro-controller detects a change in status of the wired connection to the host system, and automatically switches the input device between the wireless and wired communication protocols.

3. An input device according to claim 1, wherein the power system is configured to supply power to the chip through the wired connection to operate the input device using the wired communication protocol while charging the battery with electrical power provided through the wired connection.

4. An input device according to claim 1, further comprising a switch to enable a user to select between at least two of the following: power supplied from the battery, power supplied from the wired connection, and a battery charge mode.

5. An input device according to claim 1, wherein the wired protocol block comprises a Universal Serial Bus (USB) protocol block to communicate data with the host system through a USB connector.

6. An input device according to claim 1, wherein the wireless protocol block comprises a wireless USB protocol block to communicate data with the host system through a radio.

7. A dual protocol input device comprising:
   a chip with a number of semiconductor devices integrally formed thereon, including:
      an optical navigation sensor (ONS) to sense movement of the ONS relative to a surface;
      a wired protocol block to communicate data from the ONS to a host system by a wired communication protocol;
      a wireless protocol block to communicate data from the ONS to the host system by a wireless communication protocol;
      a power system including a power controller to switch power supplied to the chip between a battery in the input device, a first wired connection to the host system, and a second wired connection to a power adapter separate from the host system, without resetting the chip; and
      a micro-controller directly coupled through an on-chip system bus to the ONS, the power system, the wired protocol block and the wireless protocol block, to control operations thereof, and to switch the input device between the wireless communication protocol and the wired communication protocol without interruption of data between the ONS and the host system.

8. An input device according to claim 7, wherein the power system further comprises a boost regulator to boost an output voltage of the battery to an operating voltage of the chip.

9. An input device according to claim 8, wherein the power system further comprises a linear regulator to regulate power supplied through the wired connection, and a power controller to switch the power system between the boost regulator and the linear regulator.

10. An input device according to claim 8, wherein the power system includes an on-chip battery charger to charge the battery through the wired connection.

11. An input device according to claim 10, further comprising a switch to enable a user to select between at least two of the following:
   power supplied from the battery, power supplied from the wired connection, and a battery charge mode.

12. A method of operating an input device comprising:
   illuminating a surface to reflect images onto at least a portion of a chip including an optical navigation sensor (ONS), a wired protocol block, a wireless protocol block, and a micro-controller directly coupled through an on-chip system bus to the ONS, the wired protocol block and the wireless protocol block to control operations thereof;
   sensing relative movement between the ONS and the surface;
   determining status of a first wired connection coupling the wired protocol block to a host system; and
   selecting, using the micro-controller, between different modes of operation based on the determined status of the first wired connection without interruption of data between the ONS and the host system or resetting the chip,
   wherein the different modes of operation include a mode of operation in which data is communicated to the host system through the wireless protocol block and the wireless connection, and power is supplied to the chip through a second wired connection to a power adapter separate from the host system.

13. An input device according to claim 1, wherein the mixed-signal array comprises configurable memories, logic blocks, an analog multiplexer (MUX), global analog interconnections (GAI), and General Purpose Input/Outputs (GPIOs).

* * * * *